(12) United States Patent
Mangelsen et al.

(10) Patent No.: US 12,275,573 B2
(45) Date of Patent: Apr. 15, 2025

(54) THERMALLY INSULATED CONTAINERS

(71) Applicant: DGP INTELSIUS LIMITED, York (GB)

(72) Inventors: Jens Mangelsen, York (GB); Richard Merchant, York (GB)

(73) Assignee: DGP INTELSIUS LIMITED, York (GB)

( * ) Notice: Subject to any disclaimer, the term of this patent is extended or adjusted under 35 U.S.C. 154(b) by 0 days.

(21) Appl. No.: 17/426,213

(22) PCT Filed: Jan. 28, 2020

(86) PCT No.: PCT/GB2020/050197
§ 371 (c)(1),
(2) Date: Jul. 28, 2021

(87) PCT Pub. No.: WO2020/157488
PCT Pub. Date: Aug. 6, 2020

(65) Prior Publication Data
US 2022/0089353 A1 Mar. 24, 2022

(30) Foreign Application Priority Data
Jan. 28, 2019 (GB) .................................. 1901143

(51) Int. Cl.
*B65D 81/18* (2006.01)
*B65D 25/54* (2006.01)
(Continued)

(52) U.S. Cl.
CPC ......... *B65D 81/3825* (2013.01); *B65D 25/54* (2013.01); *B65D 81/18* (2013.01);
(Continued)

(58) Field of Classification Search
CPC .... B65D 77/042; B65D 81/3825; A61J 1/165; A61J 2200/72
(Continued)

(56) References Cited

U.S. PATENT DOCUMENTS

| | | | | |
|---|---|---|---|---|
| 6,135,277 A | * | 10/2000 | Armstrong | A47F 3/005 206/45.24 |
| 7,412,846 B2 | * | 8/2008 | Sekiya | B65D 81/3823 62/457.2 |

(Continued)

FOREIGN PATENT DOCUMENTS

| | | |
|---|---|---|
| CN | 108313528 A | 7/2018 |
| EP | 2883812 A1 | 6/2015 |

(Continued)

OTHER PUBLICATIONS

PCT International Search Report and Written Opinion for International Application No. PCT/GB2020/050197, dated May 6, 2020, 11 pages.

(Continued)

*Primary Examiner* — Mollie Impink
(74) *Attorney, Agent, or Firm* — Hoffman Warnick LLC

(57) ABSTRACT

A thermally insulated package for transporting a temperature sensitive payload. The thermally insulated package comprises a payload retention volume for said temperature sensitive payload; at least one layer of insulation surrounding the payload retention volume; an outer casing enclosing the at least one layer of insulation and the payload retention volume; and a recess for accommodating at least one functional device, the recess arranged between the at least one layer of insulation and the outer casing. The recess suitably provides a specific storage volume within the thermally insulated package but outside of the insulation and the payload retention volume for said the functional device, such as a temperature monitoring device, in order to con- (Continued)

veniently transport said device with the package and protect said device from physical impacts and environmental factors. A thermally insulated package kit is also disclosed.

14 Claims, 8 Drawing Sheets

(51) Int. Cl.
    *B65D 81/38*     (2006.01)
    *F17C 3/08*     (2006.01)
    *F25D 3/08*     (2006.01)

(52) U.S. Cl.
    CPC ............... *F17C 3/08* (2013.01); *F25D 3/08* (2013.01); *F25D 2201/00* (2013.01); *F25D 2303/082* (2013.01); *F25D 2303/084* (2013.01); *F25D 2303/0843* (2013.01); *F25D 2700/12* (2013.01); *F25D 2700/121* (2013.01)

(58) Field of Classification Search
    USPC ........................................................ 206/523
    See application file for complete search history.

(56) References Cited

U.S. PATENT DOCUMENTS

| | | | | |
|---|---|---|---|---|
| 8,154,421 | B2* | 4/2012 | Saltzman | H04Q 9/00 340/870.17 |
| 8,966,925 | B1* | 3/2015 | DeClementi | F28D 5/00 62/331 |
| 2008/0178629 | A1* | 7/2008 | Meether | F25D 3/08 220/592.2 |
| 2008/0208158 | A1* | 8/2008 | Goodman | B65D 81/3862 604/408 |
| 2008/0272131 | A1 | 11/2008 | Roberts et al. | |
| 2014/0070943 | A1* | 3/2014 | Breed | E05F 15/43 340/539.22 |
| 2016/0243000 | A1* | 8/2016 | Gray | F25D 11/006 |
| 2016/0347532 | A1 | 12/2016 | McCormick | |
| 2018/0009588 | A1* | 1/2018 | Grogan | B65D 81/18 |
| 2018/0328644 | A1* | 11/2018 | Rizzo | F25D 3/08 |
| 2018/0353379 | A1* | 12/2018 | Chou | A61J 1/165 |
| 2019/0367243 | A1 | 12/2019 | Tanabe | |
| 2020/0100987 | A1* | 4/2020 | Liao | A45C 11/20 |
| 2020/0180845 | A1* | 6/2020 | MokhtarzadehBahadorani | B65D 81/3862 |

FOREIGN PATENT DOCUMENTS

| | | |
|---|---|---|
| FR | 2850364 A1 | 7/2004 |
| GB | 2563732 A | 12/2018 |
| GB | 2566792 A | 3/2019 |
| JP | 2003246329 A | 9/2003 |
| JP | 2007022598 A | 2/2007 |

OTHER PUBLICATIONS

Great Britain Search Report for Application No. GB1901143.6, dated Jul. 10, 2019, 4 pages.

* cited by examiner

THERMALLY INSULATED CONTAINERS

FIELD

The present invention relates to a thermally insulated package for transporting a temperature sensitive payload and to a thermally insulated package kit. In particular the invention relates to thermally insulated packages which are adapted to house functional devices such as temperature monitoring devices, location determination devices and/or communication devices.

BACKGROUND

The transportation of temperature sensitive goods requires the use of packaging which can maintain the temperature of the temperature sensitive goods within a pre-determined range. This may be achieved by providing a packaging item with insulation, either in the form of loose insulation material or by constructing a rigid box out of an insulating material. For example, rigid insulating boxes made from polystyrene foam have been used for many years to transport various temperature sensitive goods such as medical supplies and biological samples.

Temperature sensitive goods, such as biological material, may be of high value in terms of cost and also in terms of the importance of the goods to the recipients, for example medical practitioners or researchers. In many cases, the temperature sensitive goods will only be accepted for their intended purpose if their temperature has been maintained within a specified range during transportation, for example to ensure the quality and safety of the temperature sensitive goods. Therefore it advantageous to monitor the internal temperature of such thermally insulated packages during transportation.

Current methods of monitoring the temperature of a thermally insulated package used for transporting such temperature sensitive goods involve placing temperature recording equipment inside the payload retention volume of the thermally insulated package, in order to record the internal temperature of the package, or by attaching such a device to the outside of the package and arranging a temperature sensor within the payload retention volume. This recorded temperature data can then be viewed after the thermally insulated package has been received and opened, in order to check whether the temperature specified for those temperature sensitive goods has been maintained during transportation. If the specified temperature has not been maintained then the recipient may reject the temperature sensitive goods.

SUMMARY OF THE INVENTION

It is one aim of the present invention, amongst others, to provide a thermally insulated package that addresses at least one disadvantage of the prior art, whether identified here or elsewhere, or to provide an alternative to existing thermally insulated packages. For instance it may be an aim of the present invention to provide a thermally insulated package which houses a functional device within the package, for example to enable ease of monitoring the temperature or location of the thermally insulated package.

According to aspects of the present invention, there is provided a thermally insulated package, and a kit as set forth in the appended claims. Other features of the invention will be apparent from the dependent claims, and the description which follows.

According to a first aspect of the present invention, there is provided a thermally insulated package for transporting a temperature sensitive payload, the thermally insulated package comprising:

a payload retention volume;

at least one layer of insulation surrounding the payload retention volume;

an outer casing enclosing the at least one layer of insulation and the payload retention volume; and a recess for accommodating at least one functional device, the recess arranged between the at least one layer of insulation and the outer casing.

The term thermally insulated package would be understood by the person skilled in the art as referring to a package incorporating known insulating materials with the deliberate intention of retarding the rate at which a cooled payload inside the package heats up due to the ingress of thermal energy from outside the package. Similarly, said thermally insulated package may be used to retard the rate at which a controlled room temperature payload inside the package cools down due to the outflow of thermal energy from inside the package.

Packages not comprising a significant amount of insulating material and which do not significantly retard the rate at which a cooled payload inside the package heats up (or a controlled room temperature payload inside the package cools down) would not be considered "thermally insulated packages".

The thermally insulated package comprises a payload retention volume. This payload retention volume is suitably formed from/defined by the at least one layer of insulation, for example insulating panels and/or phase-change material containing vessels. Suitably the payload retention chamber is where temperature sensitive goods would be transported in said thermally insulated package. The payload retention volume is suitably a cooled and insulated payload retention volume in use, due to the pre-cooling of at least some parts of the thermally insulated package and the insulating properties of the at least one layer of insulation.

The at least one layer of insulation surrounds the payload retention volume and suitably comprises insulating material and/or phase-change material containing vessels. Suitably the insulation layer comprises panels of insulating material and/or phase-change material containing vessels. Suitably the insulation layer comprises panels of insulating material and phase-change material containing vessels. Suitable panels of insulating materials are vacuum insulated panels. Suitably the at least one layer of insulation defines the payload retention volume and substantially defines the outer shape of the thermally insulated package.

The outer casing encloses the at least one layer of insulation and the payload retention volume. The outer casing suitably provides structural support to the arrangement of the at least one layer of insulation within the thermally insulated package and suitably protects the at least one layer of insulation and any goods in the payload retention volume from physical contact from outside the package and may protect the package from the ingress of water and/or ambient air. The outer casing may be constructed from a polymeric material or cardboard, for example.

Suitably the thermally insulated package is substantially cubic or cuboid in shape.

Said functional device which the recess of the thermally insulated package is intended to accommodate is suitably an electronic device for providing a beneficial function to the thermally insulated package, for example for providing a monitoring function. Suitable types of functional device intended to be accommodated in the recess in use are temperature monitoring devices, location determination devices, physical condition or event monitoring devices and/or communication devices. The functional device may be or include any one of more of the following: a temperature sensor, a light sensor, a shock sensor, an orientation sensor, an acceleration sensor, a speed sensor and a pressure sensor. One or more of said functional devices may be accommodated in the recess of the thermally insulated package, in use.

Suitably said functional device is a device for recording and/or communicating an internal temperature of the thermally insulated package.

The thermally insulated package comprises a recess for accommodating at least one functional device, the recess arranged between the at least one layer of insulation and the outer casing. The recess is suitably a volume within the outer casing of the thermally insulated package which is adapted to retain said functional device during transport of the package. Therefore the recess is enclosed and covered by the outer surface of the outer casing of the thermally insulated package, at least when the package is closed. The recess is outside of the at least one layer of insulation and therefore outside of the payload retention volume. The recess is suitably outside of all layers of insulation present in the thermally insulated package and is therefore in a part of the thermally insulated package which is not insulated to any significant extent and is not intended to be "temperature controlled" by the layer or layers of insulation.

Providing such a dedicated volume within the thermally insulated package but outside of the insulation and the payload retention volume means that the functional device does not have to be placed in the payload retention volume. This means that the functional device does not take up space in the payload retention volume which could otherwise be used for temperature sensitive goods and means that the payload retention volume does not have to be opened in order to insert or remove the functional device, which would adversely affect any temperature sensitive goods in the payload retention volume by exposing them to ambient conditions. Locating the recess and therefore said functional device inside the outer casing means that said functional device may be protected from physical impacts and moisture, compared to an alternative arrangement wherein such a functional device is mounted on the exterior of a thermally insulated package.

In some embodiments, the recess may be a space defined by an outer surface of an outermost layer of insulation (of the at least one layer of insulation) surrounding the payload retention and an inside surface of the outer casing. Therefore the recess may be bounded by the outermost layer of insulation and the outer casing.

In some embodiments, the recess may be formed and defined by a recess wall. The recess wall may be formed of the same material as the outer casing, for example a polymeric material or a cardboard. The recess wall may be connected to an inner surface of the outer casing. Therefore the recess may be a part of and/or be integral with the outer casing.

In some embodiments, the outer casing comprises a main body and a lid, and wherein the recess is arranged in the lid.

In some embodiments, the outer casing comprises a main body and a lid, and wherein the recess is arranged in or adjacent to the main body of the outer casing.

Suitably the recess is arranged such that opening the lid of the thermally insulated package allows access to the recess. Suitably opening the lid of the thermally insulated package opens the recess. Alternatively, the recess may comprise an openable, suitably removable, cover for selectively opening and closing the recess, suitably when the lid of the thermally insulated package is open.

The recess may comprise a transparent window which allows a user to view inside the recess from outside of the outer casing.

Suitably the recess has a size and shape which can accommodate any one of several different commercially available functional devices, for example temperature monitoring devices.

Therefore the recess suitably provides the user with the flexibility to select any of said commercially available functional devices to use with the thermally insulated package, according to the needs of the user and/or the particular functionality of the functional devices.

Suitably the recess has a capacity of up to 20% of the total volume of the thermally insulated package (wherein the total volume is suitably the volume of the package measured using its exterior dimensions and so including the volume of the outer casing). Suitably the recess has a capacity of up to 15% of the total volume of the thermally insulated package, suitably up to 10%.

Suitably the recess has a capacity of at least 1% of the total volume of the thermally insulated package, suitably at least 3%, suitably at least 5%.

Suitably the recess has a capacity of at least 10 cm$^3$, suitably at least 100 cm$^3$, suitably at least 500 cm$^3$.

Suitably the recess has a capacity of up to 3 l, suitably up to 2 l. In some embodiments, the recess has a volume of around 1 l.

The recess may comprise an insert (or a sleeve) which provides a storage volume for said at least one functional device. Therefore the recess may comprise said at least one functional device inside the insert. The insert may be located in and closely fitted in the recess and may be removable from the recess. The insert may be slidable into and out of the recess for inserting and removing said functional device from the recess of the thermally insulated package. For example, the insert may be a cardboard box having the size and shape of the recess, suitably a cuboid shape.

In some embodiments, the recess is divided into a first compartment and a second compartment, wherein the first compartment is for accommodating said at least one functional device and the second compartment is suitable for housing an accessory or a document. The recess may be divided into the first compartment and the second compartment by a part of a recess wall. Alternatively the recess may be divided into the first compartment and the second compartment by a first insert and a second insert, the first and second inserts being as discussed above. Suitably the first insert provides a storage volume for said at least one functional device and the second insert provides a storage volume for housing said accessory or document. One or both of said inserts may comprise a handle for facilitating removal of the insert from the recess.

The thermally insulated package suitably has an approximately cuboid shape. Therefore the outer casing suitably has an approximately cuboid shape. In some embodiments, the outer casing comprises six substantially planar faces and the recess is arranged within the thermally insulated package so that there are no protruding parts of any of the six faces. Such thermally insulated packages may be readily stackable with other identical (or similar) thermally insulated packages.

In some embodiments, one of the faces of the outer casing comprises a protruding part which provides the space of the recess inside the thermally insulated package. Such thermally insulated packages may provide the recess without altering the dimensions of the layer or layers of insulation and the payload retention volume, compared to a similar thermally insulated package which does not comprise such a recess. This may advantageously allow the use of standard sized parts (such as insulation members) which are readily available.

Suitably the thermally insulated package is configured to allow wireless communication between a functional device in the recess and a sensor in the payload retention volume. For example, the materials used to provide the layer or layers of insulation are suitably chosen to allow wireless communication between the recess and the payload retention volume.

Suitably said functional device comprises a wireless communication module adapted to receive one more data signals from said sensor or sensors inside the payload retention volume. By using a wireless communication module, said functional device can advantageously receive a data signal from a sensor inside payload retention volume wirelessly (if said sensor is adapted to transmit said data signals wirelessly) and therefore without compromising the thermally insulating properties of said thermally insulated package. If wiring for said temperature sensors was routed through or between thermally insulating panels of the thermally insulated package then the insulating properties of the package may be adversely affected.

Suitably the thermally insulated package is configured to allow short-range and long-range wireless communication (e.g. Bluetooth/2G/3G/4G/GPS/WAN) through the layer or layers of insulation and the outer casing. Therefore the layer or layers of insulation and the outer casing are suitably chosen to allow said short-range and long-range wireless communication. In particular, the outer casing is suitably formed of a material which allows said long-range wireless communication.

In some embodiments, the thermally insulated package comprises a channel through which a wire can pass from the recess to the payload retention volume, suitably to allow said functional device to be connected to a sensor in the payload retention volume. For example the payload retention volume may comprise a wired thermocouple for connection to said functional device in the recess. The channel may be arranged at an edge of insulating panels which provide the at least one layer of insulation material.

Suitably the thermally insulated package comprises a sensor selected from one or more of a temperature sensor, a light sensor, a shock sensor, an orientation sensor, an acceleration sensor, a speed sensor and a pressure sensor, within the payload retention volume.

Suitably the thermally insulated package comprises a temperature sensor within the payload retention volume.

Suitably the thermally insulated package comprises the functional device in the recess.

Suitably the thermally insulated package comprises a temperature sensor within the payload retention volume and the functional device within the recess, wherein the functional device is adapted to receive and record temperature data from the temperature sensor.

Suitably the functional device is received within an adapter and the adapter is received within the recess. Suitably the adapter is configured (i.e. sized and shaped) to fit closely into the recess and therefore not move significantly within the recess during normal usage of the thermally insulated package. Suitably the adapter comprises a cavity configured to closely fit a certain functional device and therefore not allow movement of the functional device within the adapter in the recess during normal usage of the thermally insulated package. The adapter may therefore be configured for a particular size and shape of functional device and recess. The adapter is suitably formed from a compressible material, for example a foam, which can compress and deform to allow insertion of the functional device into the adapter and to allow insertion of the adapter into the recess. The compressible material can then expand outwards to form an interference fit with the recess and the functional device to retain the functional device in position. The adapter may therefore protect the functional device from physical shocks during normal usage of the thermally insulated package.

In some embodiments, the adapter may be provided without a cavity and be configured to allow a user to create a suitable cavity in the adapter, for example to fit a particular functional device into such a cavity. Such an adapter may be formed of a compressible material as described above, for example a foam material, and be provided with a plurality of points or lines of weakening in the compressible material. The plurality of points or lines of weakening are arranged to facilitate a user removing parts of the compressible material in order to create a suitable cavity in the adapter to enable placement of said functional device. Suitably the plurality of points or lines of weakening are configured so that the overall integrity of the adapter is maintained in use until a cavity is intentionally created in the adapter by a user. The plurality of points or lines of weakening are suitably regularly arranged in the adapter to allow a user to select which parts of the adapter to remove in order to create a suitably sized and shaped cavity. The plurality of points or lines of weakening are suitably a plurality of regularly arranged slits passing through the adapter. Suitably the plurality of regularly arranged slits define a plurality of cuboid shaped parts of the adapter which can be selected and removed by a user. Suitably the plurality of cuboid parts of the adapter are attached to adjacent cuboid parts. Therefore the plurality of slits are suitably arranged so that the cuboid parts of the adapter are not completely severed from the rest of the adapter. Therefore the adapter may be a foam body partially divided into interconnected cuboid parts to facilitate removal of at least some of the cuboid parts from the adapter. Alternatively, the adapter may be provided with regularly arranged slits passing through the adapter which define other suitable geometric shaped parts for selective removal by a user, for example, pyramids, prisms, tetrahedrons etc.

In some embodiments, the adapter may be sufficiently compressible to accommodate a functional device without comprising a dedicated cavity for said functional device. For example, the adapter may comprise a plurality of voids which allow the adapter to compress to accommodate a functional device. In such embodiments, the adapter suitably comprises a plurality of compressible protrusions with air gaps therebetween, for example regularly spaced pyramidal shaped compressible protrusions. Placing a functional device on said protrusions would therefore compress the protrusions which contact said functional device and leave uncompressed the protrusions which do not contact said functional device, effectively creating a cavity-like space in the adapter for said functional device. The adapter may be a two part adapter comprising a top and bottom part, each part being as described above, wherein a functional device can be arranged in-between the top and bottom parts to securely retain and protect said functional device.

The thermally insulated package comprises at least one layer of insulation surrounding the payload retention volume. Suitably the thermally insulated package comprises more than one layer of insulation surrounding the payload retention volume. Suitably the thermally insulated package comprises at least two layers of insulation surrounding the payload retention volume. Therefore the thermally insulated package may comprise a first layer of insulation which surrounds the payload retention volume and a second layer of insulation which surrounds the first layer of insulation. Both the first and second layers of insulation are suitably inside the outer casing and outside the payload retention volume.

The thermally insulated package may comprise a layer of insulation provided by vacuum insulated panels. The vacuum insulated panels may be provided by discrete, separate panels, for example six vacuum insulated panels which together can be arranged to abut each other to define a cuboid or cubic shape complementary to the shape of the payload retention volume. Alternatively the vacuum insulated panels may be provided by a pre-joined or pre-formed vacuum insulated vessel or base, for example having five sides, which define a five sides of a cuboid or cubic shape complementary to the shape of the payload retention volume, and a separate vacuum insulating panel to complete the cuboid or cube, for example for use as or in a lid.

Vacuum insulated panels may be susceptible to damage from abrasion in use. Such damage may pierce the sealed cavity of the vacuum insulated panels, which would destroy the vacuum and significantly worsen the insulation properties of the vacuum insulation panels. Suitably a protective liner is provided to protect the vacuum insulated panels from damage on insertion or removal from the package. The protective liner may be arranged on an inner or outer surface of the vacuum insulated panels, or on both the inner and outer surfaces. The protective liner may be a film or sheet material which is arranged on the inner or outer surfaces of the vacuum insulated panels, or on both. The protective liner may be formed from a polymeric material, may be sufficiently rigid to retain its shape when free standing and may have a size and shape which conforms to the inner or outer surfaces of the vacuum insulated panels (when arranged in the thermally insulated package), suitably conforming to the inner surfaces. Suitably the first or the second layer of insulation comprises vacuum insulated panels and the protective liner is arranged between the first layer of insulation and the second layer of insulation.

Suitably the first or the second layer of insulation comprises phase-change material containing vessels. Suitably the first layer of insulation is provided by vacuum insulation panels (VIPs) and the second layer of insulation is provided by phase-change material containing vessels (PCMs). Therefore the thermally insulated package comprises a layer of vacuum insulation panels and a layer of phase-change material containing vessels. Suitably the phase-change material containing vessels define a payload retention volume and are therefore the innermost layer of insulation in the thermally insulated package.

Suitably phase-change material containing vessels are arranged in the thermally insulated package to define a cuboid or cubic payload retention volume. Suitably the phase-change material containing vessels are arranged to abut each other in order to minimise any gaps between the phase-change material containing vessels which may admit air into the payload retention volume. It will be appreciated that even when the phase-change material containing vessels abut each other, the payload retention volume may not be completely air tight.

Suitable phase-change material containing vessels and phase-change materials contained within them are known in the art.

Suitably the vacuum insulation panels are arranged around the phase-change material containing vessels in order to minimise any gaps which may admit air through the insulation layer towards the payload retention volume. However, the insulation layer may not be completely air tight.

In some embodiments, wherein the thermally insulated package comprises a protective liner, the protective liner suitably provides a vessel, for example having five sides of a cubic or cuboid shape with one side open, into which the PCMs can be arranged to form and surround the payload retention volume. This may facilitate the assembly of the thermally insulated package, as well as providing the VIPs with protection from damage.

In some embodiments, the thermally insulated package is a cryogenic package (or cryogenic storage Dewar), for example a package configured to receive liquid nitrogen coolant. In such embodiments, the cryogenic package may have the structure of a Dewar flask wherein the layer of insulation is provided by a vacuum chamber surrounding the payload retention volume. The outer casing is suitably a rigid metal, for example formed of aluminium. The payload retention volume of the cryogenic package is suitably configured to receive a cryogenic material, suitably a cryogenic liquid, for example liquid nitrogen. The payload retention volume is suitable for also receiving a payload to be transported, suitably contained within an inner package to prevent the payload directly contacting the cryogenic material.

In such embodiments, the cryogenic package comprises a cap which covers and sufficiently seals the payload retention volume (whilst providing for the escape of gas evaporating from the cryogenic material where necessary). Suitably the cap comprises the recess for accommodating said at least one functional device. Suitably the recess is accessible from above the cap, through an openable lid of the cap. The cap may have a transparent top or lid to allow a user to view a functional device arranged in the recess, for example in order to read a display on said functional device.

Suitably the recess is provided with an adapter as described above, for receiving said functional device. The adapter may have any of the suitable features and advantages described above. Therefore the adapter may allow the cryogenic package to be used with a functional device having any size or shape, provided the overall size of said functional device is smaller than the recess in the cap.

Suitably, insulation is provided in a base of the cap in order to protect said functional device from the cold of the cryogenic material. Suitably the cap is provided with a port through which can be passed a wire to connect said functional device to a temperature probe arranged in the payload retention volume.

According to a further aspect of the invention, there is provided a cap of a cryogenic package, the cap comprising a recess for accommodating at least one functional device. Suitably the cap comprises a threaded portion for engagement with a complimentary threaded portion on a cryogenic package (or cryogenic storage Dewar). Suitably the cap can be used in conjunction with known cryogenic packages. The cap may have any of the suitable features or advantages discussed above.

According to a second aspect of the present invention, there is provided a thermally insulated package kit for transporting a temperature sensitive payload, the kit comprising a thermally insulated package according to the first aspect and a first adapter for receiving and accommodating in the recess of the thermally insulated package a first functional device.

The adapter and said functional device may have any of the suitable features described in relation to the first aspect.

Suitably the kit comprises a second adapter for receiving and accommodating in the recess of the thermally insulated package a second functional device, wherein said second functional device has a different size and/or shape to said first functional device.

Suitably the adapter or adapters have a size and shape which allows the adapter to fit snugly into the recess of the thermally insulated package. Suitably the adapter or adapters have a cavity which is sized and shaped to snugly fit a particular functional device, suitably a commercially available functional device. Suitably the kit comprises more than two such adapters, each having a cavity sized and/or shaped to fit a different sized and/or shaped functional device.

The kit of this second aspect may therefore allow a user to select from more than one different commercially available functional device for use in the thermally insulated package, according to the needs of the user and the particular functions provided by said functional devices.

According to a third aspect of the present invention, there is provided a thermally insulated package for transporting a temperature sensitive payload, the thermally insulated package comprising:

a payload retention volume;

at least one layer of insulation surrounding the payload retention volume;

an outer casing enclosing the at least one layer of insulation and the payload retention volume; and a tray for accommodating at least one functional device, the tray arranged inside the payload retention volume.

The tray for accommodating at least one functional device is suitably configured to be placed on top of a payload unit within the payload retention volume. Suitably the payload retention volume comprises an inner box formed from a packaging blank which fits inside the at least one layer of insulation surrounding the payload retention volume. Suitably the tray is placed inside said box, along with a payload for transportation in the thermally insulated package. The tray may be formed from a packaging blank. The tray may be formed from the same packaging material as the inner box, for example cardboard. The tray and the inner box may be formed from the same packaging blank, for example a cardboard packaging blank. Such an integral tray and inner box packaging blank may provide the advantage that only one unit needs to be stocked by a supplier and/or user of such thermally insulated packages in order to provide the inner box for carrying a payload and a tray to fit within said inner box and support a functional device, for example a temperature data logger.

Suitably the tray comprises a recess for accommodating at least one functional device. The recess may have any of the suitable features and advantages described in relation to the recess of the thermally insulated package of the first aspect, where appropriate.

The recess may have a suitable shape and size to accommodate a particular functional device. In some embodiments the recess may be provided with an adapter as described in relation to the first aspect for receiving said functional device.

The recess is suitably formed of a depression in an otherwise planar tray. Therefore the tray suitably comprises two wing sections arranged on opposite sides of the recess. Suitably the wing sections are configured to each rest on a payload item, with the recess (and therefore any functional device arranged therein) arranged between said payload items. The wing sections suitably allow the tray, and any functional device arranged therein, to be supported and maintained in a desired orientation, suitably horizontal with the functional device centrally located in the payload retention volume, when the tray is packed in the thermally insulated package in an appropriate manner with other items underneath the wing sections, such as payload items. The tray can therefore keep a functional device in a desired orientation during transit. It will be appreciated that the wing sections and the recess could be arranged in other configurations for the functional device to be maintained in a different desired position and orientation.

The tray may be formed from a packaging blank by providing a packaging blank with suitable fold lines and cut-out parts to allow assembly of the tray.

The thermally insulated package of this third aspect may comprise a second recess for accommodating at least one functional device, the second recess arranged between the at least one layer of insulation and the outer casing. The second recess may have any of the suitable features and advantages described in relation to the recess of the thermally insulated package of the first aspect. In said embodiments, the recess in the tray may be referred to as the first recess. In such embodiments, the first recess may be used to receive a temperature sensor and the second recess a temperature data logger, which are configured to communicate with each other, for example by a wireless communication protocol.

According to a fourth aspect of the present invention, there is provided a packaging blank comprising a plurality of interconnected box panels and a detachable tray piece.

The packaging blank may be considered to comprise an integrally formed plurality of box panels and a detachable tray piece.

The interconnected box panels are configured for assembly into a box, for example the inner box described above in relation to the third aspect. The tray piece is configured for assembly into a tray for accommodating at least one functional device in a thermally insulated package, as described above in relation to the third aspect. Suitably the tray piece is configured to form a tray which fits into an inner box assembled from the interconnected box panels. Suitably the tray piece is configured to form a tray which has a size and shape which allows it to fit snugly into an opening of an inner box assembled from the interconnected box panels.

Suitably the interconnected box panels are divided by fold lines between adjacent panels to facilitate assembly into a box. Suitably the tray piece is connected to at least one of the plurality of interconnected box panels by a line of weakening in the packaging material which facilitates separation of the tray piece from the packaging blank, for example a score line or a line of perforations. Suitably the tray piece is provided with fold lines and cut-out sections to facilitate assembly of the tray piece into a said tray for accommodating at least one functional device described above.

Suitably the packaging blank is formed of cardboard.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

Figure 1:
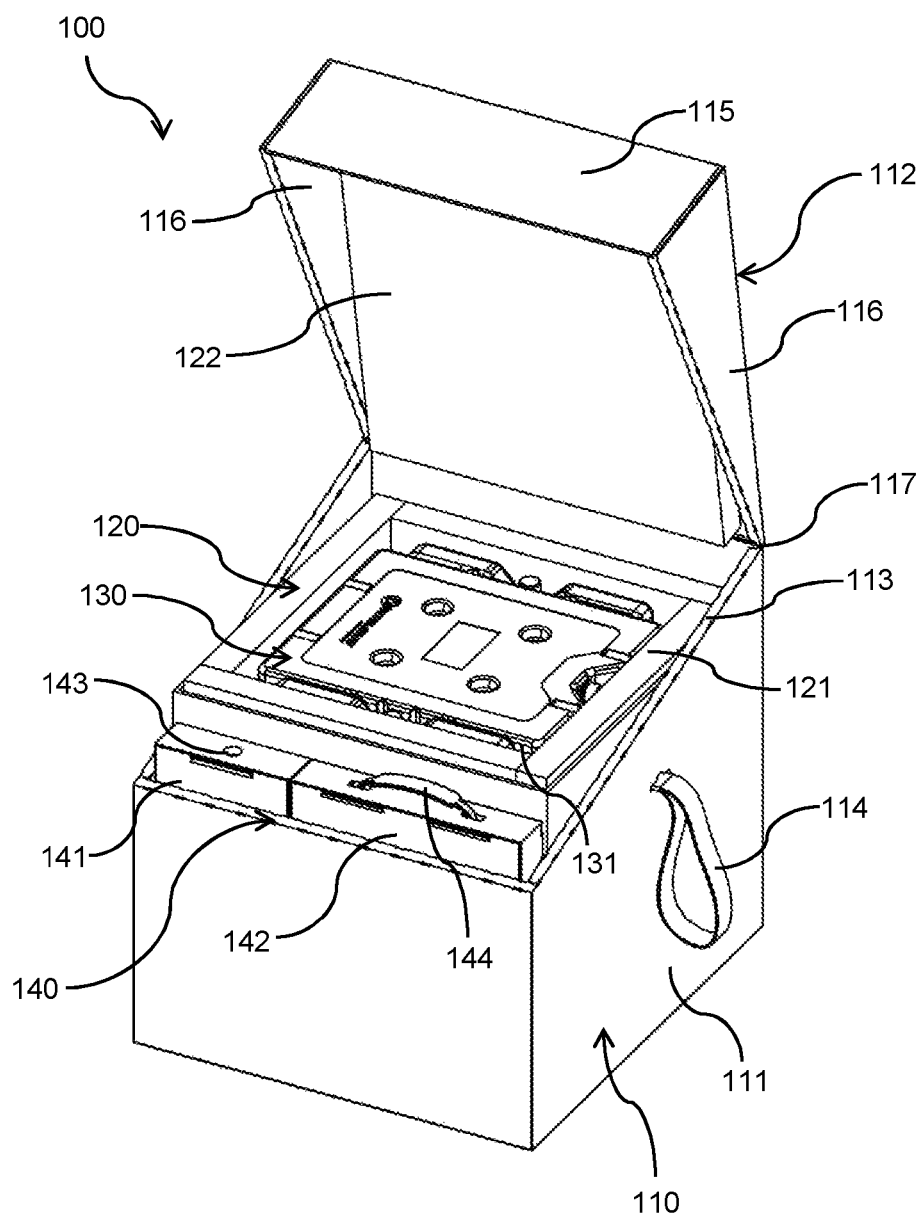
FIG. 1 is a perspective view of a thermally insulated package according to the first aspect of the present invention, in an open configuration.

FIG. 1 shows a thermally insulated package 100 having external dimensions of 426 mm×386 mm×388 mm, therefore a total external volume of 63.8 l. The thermally insulated package 100 comprises an outer casing 110, a layer of vacuum insulation panels 120, a layer of phase-change material containing vessels 130, a payload retention volume (not shown) within the layer of phase-change material containing vessels 130 and a recess 140. The payload retention volume has a capacity of 11.7 l. The outer casing 110 is a cuboid hollow box formed of cardboard but may alternatively be formed from a plastics material, for example a rigid plastics material. The outer casing 110 comprises base 111 and lid 112, which are joined at a hinge region 117. Base 111 provides substantially five sides the cuboid outer casing and comprises rim 113. The lid 112 comprises front face 115 and side faces 116. The front face 115 and side flaps 116 provide a part of the front and side faces of the cuboid outer casing and form a close fit with the rim 113 of the base 111 of the outer casing, when closed. This arrangement means that the contents of the thermally insulated package, particularly in the recess 140, are partially exposed on the front and sides of the package when the package 100 is open, as shown. The outer casing 110 comprise a strap 114 for retaining the thermally insulated package 100 in a closed configuration.

Figure 3:
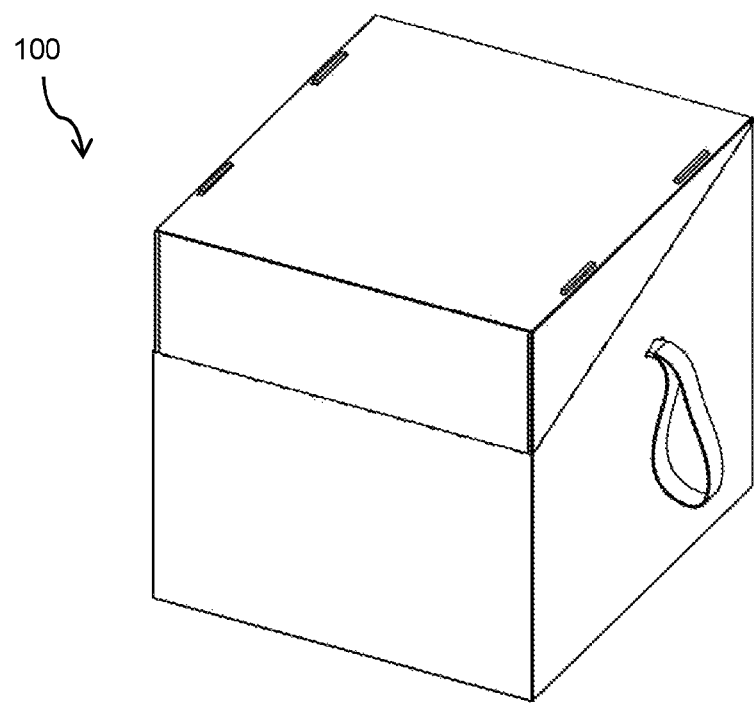
FIG. 3 is a perspective view of a thermally insulated package according to the first aspect of the present invention, in a closed configuration.

The layer of vacuum insulation panels 120 comprise six VIPs, a bottom VIP (not shown), four side VIPs 121 and a top VIP 122 which affixed to the inside of the lid 112. The top VIP 122 is arranged to abut the four side VIPs 121 to form the complete layer of VIP 120, when the package 100 is closed, as shown in FIG. 3. The insulation panels 120 may be vacuum insulation panels (VIPs) known in the art. The layer of vacuum insulation panels 120 surround and enclose the layer of phase-change material containing vessels 130, when the package 100 is closed.

The phase-change material containing vessels 130 comprise six phase-change material containing vessels which define and enclose the internal payload retention chamber for placing a thermally sensitive payload in during transportation. The phase-change material containing vessels 130 comprise a bottom PCM vessel (not shown) which is placed on top of the bottom VIP and forms the base of the payload retention volume, four side PCM vessels 131 which are placed side-by-side with the side VIPs 121, and a top PCM vessel 132 which forms the top of the payload retention volume and which contacts a bottom face of the top VIP 122, when the package 100 is closed.

Suitable phase-change material containing vessels 130 are known in the art and may be constructed of a polymeric material and may contain a phase-change material with a freezing/melting point of, for example from 4° C. to 6° C., from 17° C. to 19° C. or from −20° C. to −22° C. Such phase-change materials are known in the art.

The thermally insulated package 100 is intended to be used to transport temperature sensitive goods within the payload retention volume. In order to do this the phase-change material containing vessels 130 are conditioned by cooling using known techniques and partially assembled, along with the insulation panels 120, within the outer layer to define the internal payload retention chamber. A payload to be transported at a temperature within a specified range (typically lower than ambient temperature), for example a sample of biological material, is placed within the internal payload retention chamber and assembly of the thermally insulated package 100 is completed by arranging the top-most PCM in place, as shown and closing the lid.

The recess 140 is arranged at the front of the thermally insulated package 100 and is between and defined by an inside surface of the outer casing 110 and an outer surface of the side VIPs 121 (mainly the front VIP). The recess 140 is enclosed when the thermally insulated package 100 is in a closed configuration. The recess has a volume of 0.975 l and provides a dedicated space outside of the layer of vacuum insulation panels 120, the layer of phase-change material containing vessels 130 and the payload retention volume for accommodating a functional device selected from a range of such commercially available functional devices, optionally with a suitable adapter, and optionally further accessories and documents.

Figure 2:
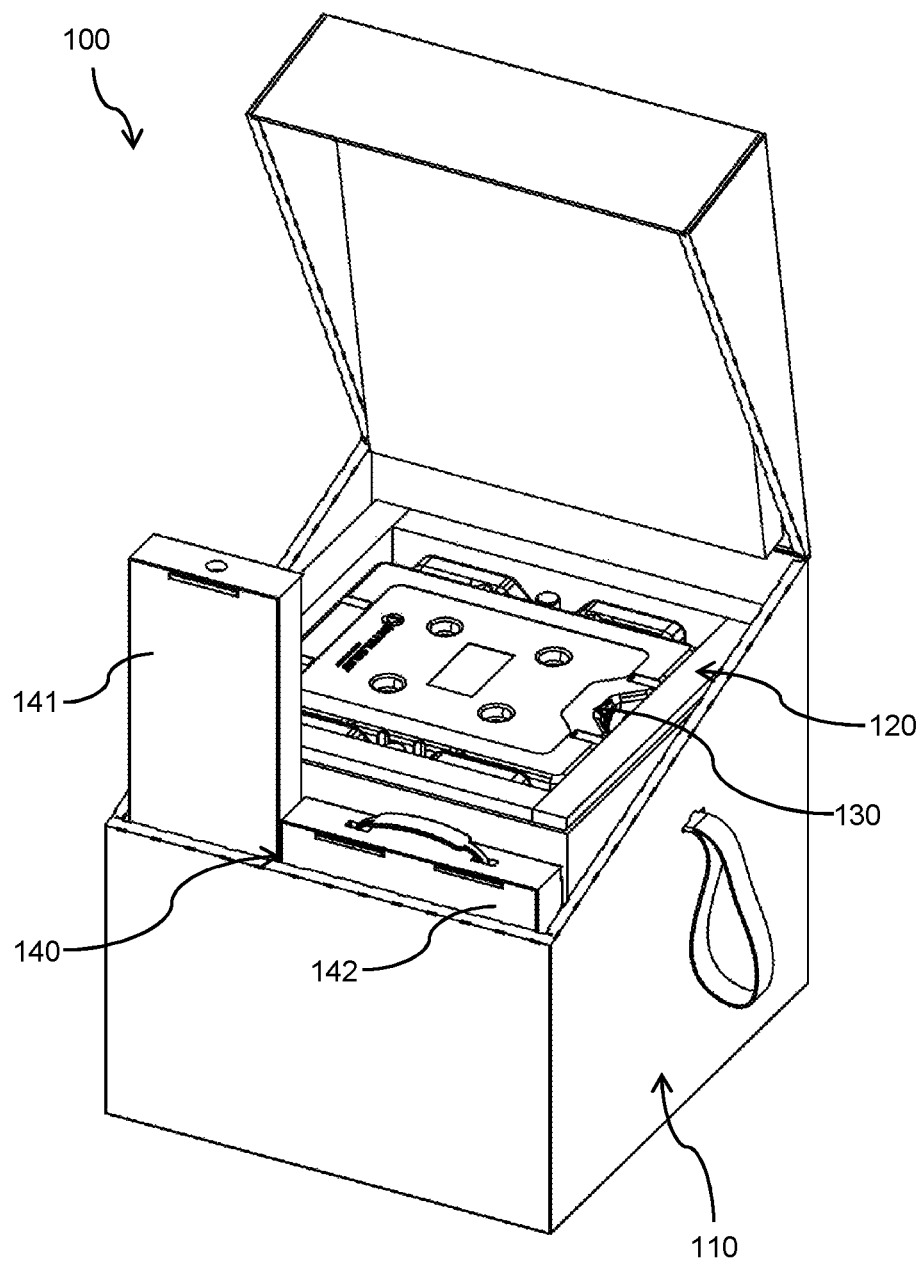
FIG. 2 is a perspective view of a thermally insulated package according to the first aspect of the present invention, in an open configuration.
Figure 4:
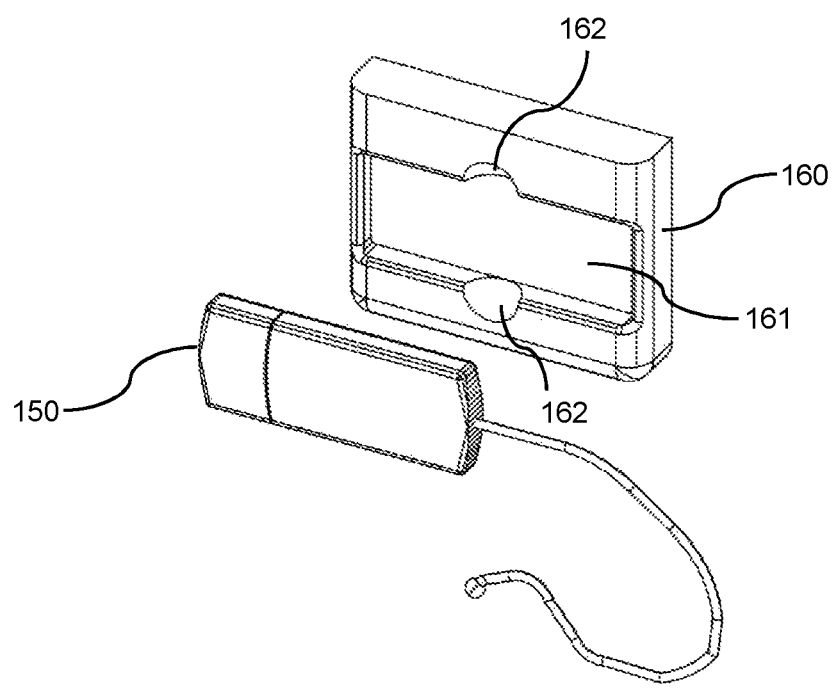
FIG. 4 is a perspective view of an adapter and a functional device for use in the thermally insulated package of the first aspect of the present invention.

The recess 140 comprises first insert 141 and second insert 142 which are cuboid in shape and are of a size and shape which closely fits into the recess 140 to occupy substantially all the space within the recess 140. Therefore the first 141 and second inserts 142 abut each other and cannot move significantly within the recess or in relation to each other. The first insert 141 and the second insert 142 are formed of cardboard and are openable hollow boxes. The first insert 141 is suitable for accommodating a functional device, for example a temperature monitoring device. A suitable temperature sensor for use with the functional device may be arranged within the payload retention volume. The first insert may comprise a functional device 150 shown in FIG. 4, which represents a Sendum PT300D device, and an adapter 160 formed of a foamed polymeric material. The adapter 160 has a size and shape to closely fit within the first insert 141 so that it occupies substantially all the space within the first insert 141. The adapter 160 comprises cavity 161 for receiving and retaining the functional device 150. The cavity 161 is of a size and shape to closely fit and retain the functional device 150. The adapter 160 also comprises cut-away portions 162 which are arranged to allow a user to grip the sides of the functional device 150 in order to facilitate removal of the functional device from the cavity 161. The functional device 150 in use is supported and retained in the adapter 160 within the first insert 141 within the recess 140 of the thermally insulated package 100 so that the functional device 150 is protected from physical shocks and the outside environment. FIG. 2 shows first insert 141 partially removed from the recess 140. The first insert comprises a through-hole 143 through which a wire can pass, for use when the functional device contained within the first insert 141 has a wired connection to a sensor.

The second insert 142 is suitable for accommodating accessories or documents which may be necessary to send with the thermally insulated package, such as certifications or details of the temperature sensitive goods being transported. Alternatively, the second insert could comprise a second functional device in a second adapter. Second insert 142 is provided with a handle 144 for facilitating removal of the second insert from the recess 140.

Figure 5:
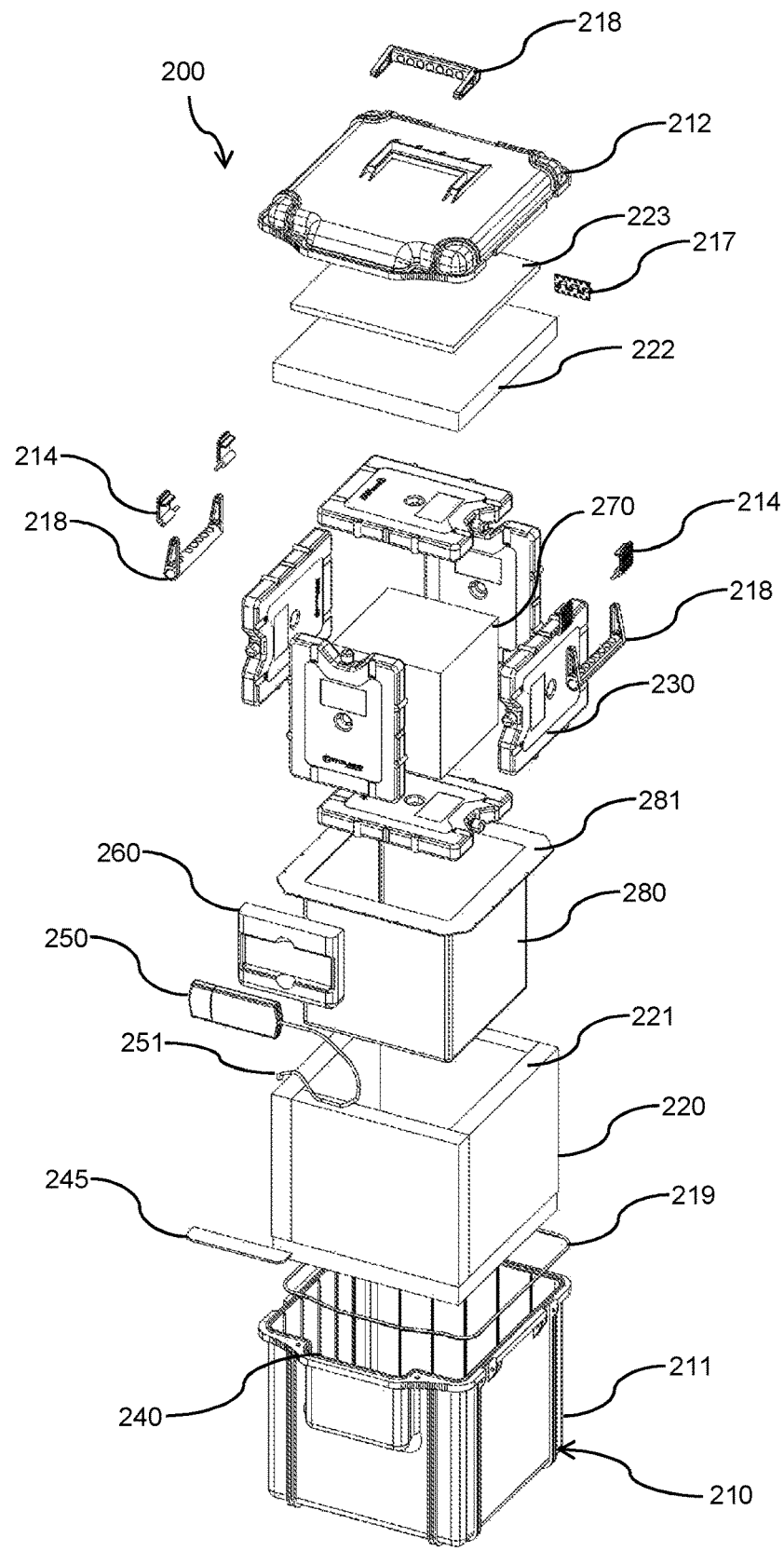
FIG. 5 is an exploded view of a thermally insulated package according to the first aspect of the present invention.

FIG. 5 shows a thermally insulated package 200 comprising an outer casing 210, a layer of vacuum insulation panels 220, a layer of phase-change material containing vessels 230, a payload retention volume 270 within the layer of phase-change material containing vessels 230, and a recess 240, similar to the equivalent parts of thermally insulated package 100. In thermally insulated package 200, the outer casing is provided by base 211 and lid 212 which are joined with a hinge 217. The base 211 and lid 212 are formed of a rigid polymeric material to provide durability to the package 200. A gasket seal 219 is provided between the base 211 and lid 212 in order to make the thermally insulated package 200 water and air tight, insofar as practicable.

Figure 6:
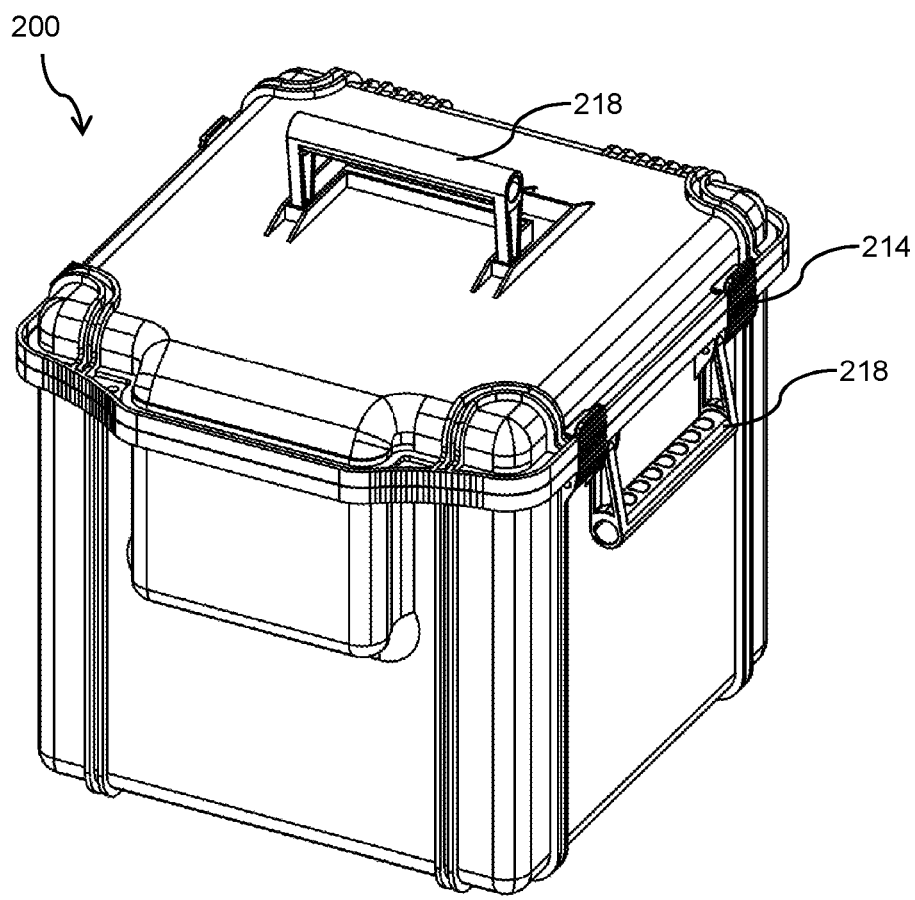
FIG. 6 is a perspective view of a thermally insulated package according to the first aspect of the present invention, in a closed configuration.

Outer casing 210 comprises locking flaps 214 for securing the lid 212 onto the base 211 when closed, and carry handles 218 for facilitating manual handling of the thermally insulated package 200. FIG. 6 shows thermally insulated package 200 in a closed and locked configuration with locking flaps 214 and carry handles 218.

The layer of vacuum insulation panels 220 comprises a VIP base 221, which provides five integrally formed faces of the cuboid shape of the layer of vacuum insulation panels 220 (a bottom face and four side faces), and a top VIP 222 to complete the cuboid. Within the VIP base 221, the layer of phase-change material containing vessels 230 are arranged as described in relation to thermally insulated package 100 to enclose payload retention volume 270. In between the layer of vacuum insulation panels 220 and the layer of phase-change material containing vessels 230 is arranged protective liner 280 which if formed of a rigid polymeric material and has a complimentary shape to the VIP base 221. The protective liner 280 comprises flange 281 for engagement with the upper edges of VIP base 221. The protective liner 280 prevents the PCM vessels of 230 from abrading and damaging the VIP base 221. A compression pad 223 is arranged between the top VIP 222 and the lid 212 to be at least partially compressed when the lid 212 is closed to apply a pressure to and urge together the layer of vacuum insulation panels 220 and the layer of phase-change material containing vessels 230 in order to minimise air gaps between these different insulation parts.

Recess 240 is formed in the base 211 of the outer casing 210, which means that in the region of the recess 240 the base 211 protrudes from the rest of the front face of the base. The recess 240 is defined by an inside surface of the outer casing 210 and an outer surface of the VIP base 221 (mainly the front of the VIP base 221). The recess 240 comprises functional device 250 and adapter 260 which are as described in relation to thermally insulated package 100. Functional device 250 comprises internal temperature sensor 251 connected by a wire, for arrangement within the payload retention volume 270. The recess 240 additionally comprises recess cover 245 to provide further protection for the contents of the recess.

Aside from the differences noted above, the thermally insulated package 200 functions and is used in a similar manner to the thermally insulated package 100.

Figure 7:
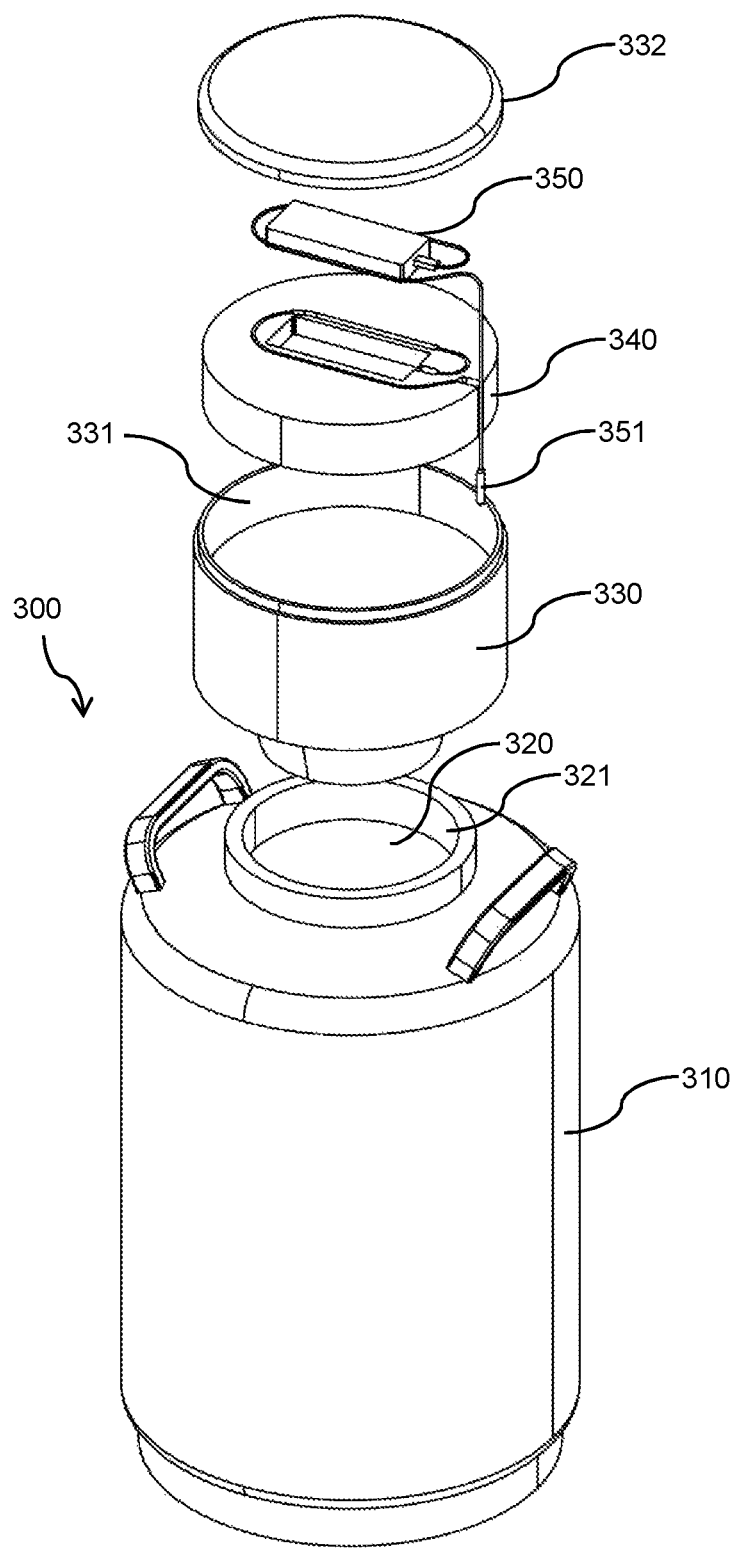
FIG. 7 is an exploded view of a cryogenic package according to the first aspect of the present invention.

FIG. 7 shows a thermally insulated package 300 which is a cryogenic package. The cryogenic package 300 comprises an outer casing 310 formed of aluminium, a vacuum chamber within the outer casing (not shown) and a payload retention volume 320 surrounded by the vacuum chamber and the outer casing 310. The payload retention volume 320 is accessible through opening 321. The payload retention volume 320 is intended to by supplied with cryogenic material (for example liquid nitrogen) and a payload to be transported, suitably housed in a further container to separate the payload from the cryogenic material. The cryogenic package 300 comprises cap 330 for fitting into opening 321 to substantially seal the payload retention volume 320. The cap 330 comprises recess 331 in which adapter 340, functional device 350 (for example a temperature data logger) and internal temperature sensor 351 are arranged, as described above for package 200. The cap 330 comprises a through-hole (not shown) through which a wire of internal temperature sensor 351 can pass to allow the internal temperature sensor 351 to be arranged in the payload retention volume 320, in use. The cap 330 comprises insulation in its base to insulate the recess 331 (and any functional device placed therein) from the low temperature of the cryogenic material in the payload retention volume 320. Cap 330 also comprises lid 332 for covering and retaining the functional device 350 and adapter 340 in the recess 331.

Figure 8:
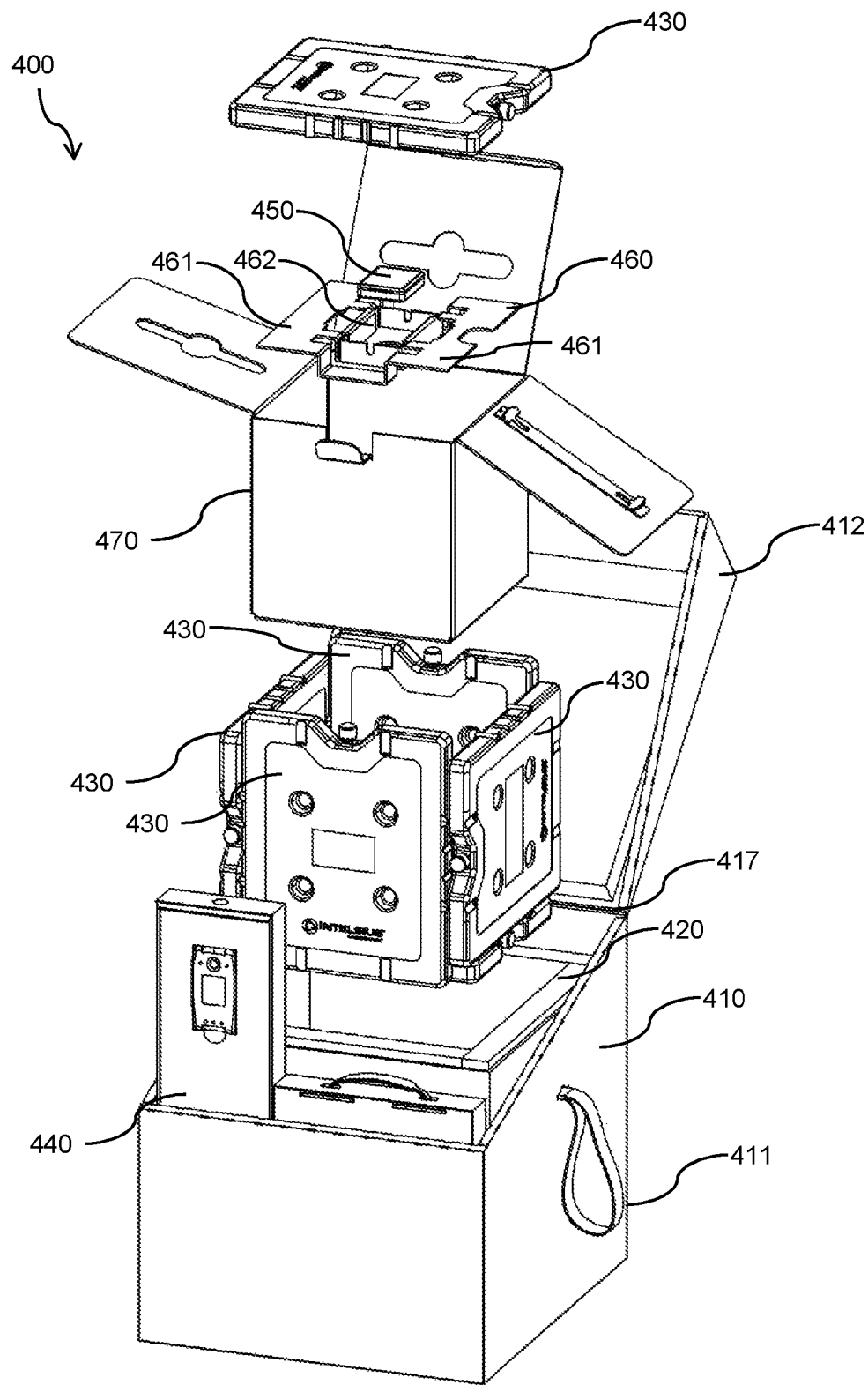
FIG. 8 is an exploded view of a thermally insulated package according to the third aspect of the present invention.

FIG. 8 shows a thermally insulated package 400 having the same dimensions and many of the same features as the thermally insulated package 100 of FIG. 1. The thermally insulated package 400 comprises outer casing 410, a layer of vacuum insulation panels 420, a layer of phase-change material containing vessels 430, a payload retention volume encased in an inner box 470 within the layer of phase-change material containing vessels 430, and a recess 440. The outer casing 410 comprises base 411 and lid 412, which are joined at a hinge region 417. The inner box 470 is for carrying a payload (not shown) and comprises tray 460 arranged within the inner box 470, suitably with payload items supporting the tray by contacting each of the tray wing sections 461 from underneath. The tray 460 comprises recess 462 for accommodating functional device 450, as described above in relation to the recess in FIG. 1. Functional device 450 suitably fits snugly in the recess 462 of tray 460. Alternatively, an adapter may be provided to receive the functional device 450, the adapter configured to fit snugly in the recess 462.

The recess 440 may contain an additional functional device or may contain a functional device, for example a temperature data logger, which communicates with a sensor arranged in the tray recess 462, for example a temperature sensor. In alternative embodiments, the thermally insulated package may not comprise recess 440 and therefore may only contain a recess for a functional device in tray recess 462.

Figure 9:
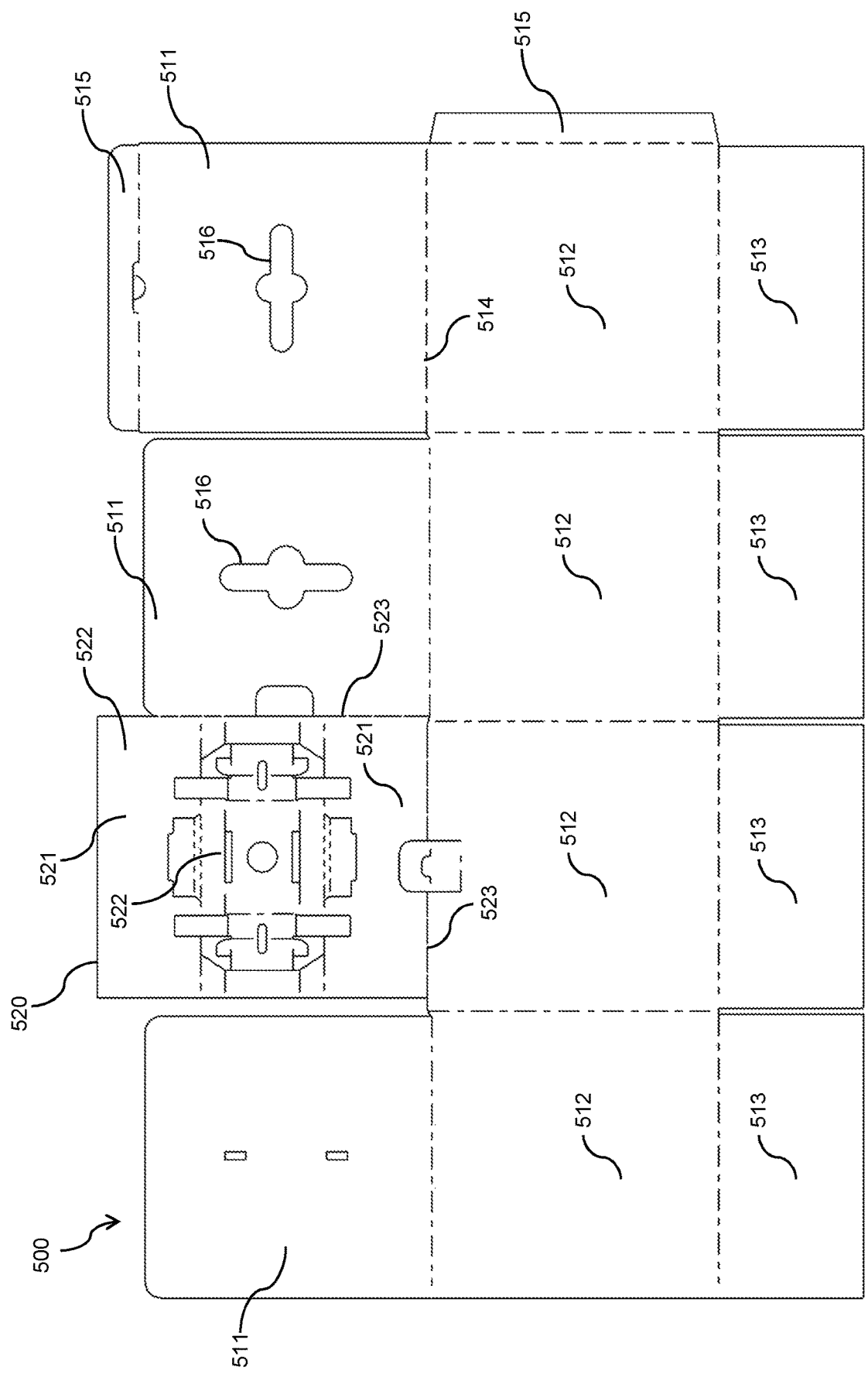
FIG. 9 is a plan view of a packaging blank according to the fourth aspect of the present invention.

The inner box 470 and the tray 460 are provided by a single packaging blank 500 as shown in FIG. 9. Packaging blank 500 comprises plurality of interconnected box panels 510 configured to facilitate assembly into an inner box 470 of FIG. 8, and a detachable tray piece 520. The plurality of interconnected box panels 510 comprise three lid panels 511, four side panels 512 and four base panels 513. Fold lines 514 are provided between adjacent panels. On assembly into an inner box 470, the lid panels 511 overlap to provide the lid of the box (with cut outs 516 allowing a handle to be attached to the lid), the side panels 512 provide the side faces of the box 470 and the base panels 513 overlap to provide the base of the inner box 470. Flaps 515 are also provided to assist in such an assembly.

The tray piece 520 comprises wing sections 521 and a recess section 522 provided with the cut outs and fold lines shown which are configured to facilitate assembly of the tray piece 520 into a tray 460 of FIG. 8 for receiving a functional device 450. The cut outs and fold lines of the tray piece 520 are arranged such that the wing sections 521 are folded and moved towards each other whilst the centre of the recess section 522 is moved downward with respect to the wing sections 521 in order to produce a three dimensional recess which has a base beneath the wing sections 521 and four side walls extending from the wing sections 521 to the base. This recess 462 has a size and shape suitable for accommodating a functional device. An adapter may be used to accommodate functional devices of different shapes and sizes in the same recess 462 in the tray 460.

The tray piece 520 is connected to the adjacent panels 511/512 by perforated lines 523 which allow a user to easily tear across to separate the tray piece 520 from the interconnected panels 510 and so assemble the inner box 470 and the tray 460 for use in a suitable thermally insulated package as described herein. The packaging blank 500 advantageously provides both the interconnected panels 510 for assembly into the inner box 470 and the tray piece 520 for assembly into the tray 460 in one component or unit. This may simplify the stock keeping needs of a supplier and/or user of such component parts for thermally insulated packages and therefore make the supply chain and/or use of such thermally insulated packages more cost and time efficient. Furthermore, providing both the interconnected panels 510 and the tray piece 520 in one packaging blank may reduce wastage of packaging material compared to the manufacture of separate packaging blanks for both the inner box 470 and the tray 460. Therefore the packaging blank 500 may have the further advantage of reducing material costs and reducing the environmental impact of the packaging.

In summary, the present invention provides a thermally insulated package for transporting a temperature sensitive payload. The thermally insulated package comprises a payload retention volume for said temperature sensitive payload; at least one layer of insulation surrounding the payload retention volume; an outer casing enclosing the at least one layer of insulation and the payload retention volume; and a recess for accommodating at least one functional device, the recess arranged between the at least one layer of insulation and the outer casing. The recess suitably provides a specific storage volume within the thermally insulated package but outside of the insulation and the payload retention volume for said the functional device, such as a temperature monitoring device, in order to conveniently transport said device with the package and protect said device from physical impacts and environmental factors. A thermally insulated package kit is also provided.

Although a few preferred embodiments have been shown and described, it will be appreciated by those skilled in the art that various changes and modifications might be made without departing from the scope of the invention, as defined in the appended claims.

Throughout this specification, the term "comprising" or "comprises" means including the component(s) specified but not to the exclusion of the presence of other components. The term "consisting essentially of" or "consists essentially of" means including the components specified but excluding other minor components unrelated to the technical effect of the invention.

The term "consisting of" or "consists of" means including the components specified but excluding addition of other components.

Whenever appropriate, depending upon the context, the use of the term "comprises" or "comprising" may also be taken to encompass or include the meaning "consists essentially of" or "consisting essentially of", and may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention as set out herein are also to be read as applicable to any other aspect or exemplary embodiments of the invention, where appropriate. In other words, the skilled person reading this specification should consider the optional features for each exemplary embodiment of the invention as interchangeable and combinable between different exemplary embodiments.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, and drawings), and/or all of the steps of any method or process so disclosed, may be combined in any combination, except combinations where at least some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, and drawings), or to any novel one, or any novel combination, of the steps of any method or process so disclosed.

The invention claimed is:

1. A thermally insulated package for transporting a temperature sensitive payload, the thermally insulated package comprising:
   a payload retention volume;
   at least one layer of insulation surrounding the payload retention volume;
   an outer casing enclosing the at least one layer of insulation and the payload retention volume; and
   a recess for accommodating at least one functional device, the recess arranged between the at least one layer of insulation and the outer casing,
   wherein the recess is outside of all layers of insulation present in the thermally insulated package, the recess is provided by a region of the outer casing which protrudes from a front face of the outer casing, the outer casing comprises a main body and a lid, and the recess is arranged such that opening the lid of thermally insulated package allows access to the recess.

2. The thermally insulated package according to claim 1, wherein the recess has a capacity of up to 20% of a total volume of the thermally insulated package, the total volume of the thermally insulated package being calculated using exterior dimensions of the thermally insulated package.

3. The thermally insulated package according to claim 1, comprising a temperature sensor within the payload retention volume.

4. The thermally insulated package according to claim 1, configured to allow wireless communication between a functional device in the recess and a sensor in the payload retention volume.

5. The thermally insulated package according to claim 1, wherein the recess is arranged in the main body.

6. The thermally insulated package according to claim 1, wherein the recess is divided into a first compartment and a second compartment, wherein the first compartment is for accommodating said at least one functional device and the second compartment is suitable for housing an accessory or a document.

7. The thermally insulated package according to claim 1, wherein the outer casing has an approximately cuboid shape.

8. The thermally insulated package according to claim 1, wherein the at least one layer of insulation surrounding the payload retention volume comprises a first layer of insulation which surrounds the payload retention volume and a second layer of insulation which surrounds the first layer of insulation.

9. The thermally insulated package according to claim 8, wherein the first or the second layer of insulation comprises vacuum insulated panels and wherein a protective liner is arranged between the first layer of insulation and the second layer of insulation.

10. The thermally insulated package according to claim 8, wherein the first or the second layer of insulation comprises phase-change material containing vessels.

11. The thermally insulated package according to claim 1, wherein the recess comprises a functional device.

12. The thermally insulated package according to claim 11, wherein the functional device is received within an adapter and wherein the adapter is received within the recess.

13. A thermally insulated package kit for transporting a temperature sensitive payload, the kit comprising a thermally insulated package according to claim 1 and a first adapter for receiving and accommodating in the recess of the thermally insulated package a first functional device.

14. The thermally insulated package kit of claim 13 comprising a second adapter for receiving and accommodating in the recess of the thermally insulated package a second functional device, wherein said second functional device has a different size to said first functional device.

* * * * *